United States Patent [19]

Hang et al.

[11] Patent Number: 4,856,670

[45] Date of Patent: Aug. 15, 1989

[54] LOW TEMPERATURE PROCESSING TRANSFER PRINTING INK

[75] Inventors: Kenneth W. Hang, Princeton Jct.; Wayne M. Anderson, Trenton, both of N.J.

[73] Assignee: RCA Licensing Corp., Princeton, N.J.

[21] Appl. No.: 142,963

[22] Filed: Jan. 12, 1988

[51] Int. Cl.$^4$ .............. C08K 3/40; C08F 265/06; B32B 17/06; H01J 61/40

[52] U.S. Cl. .............. 220/2.1 A; 428/428; 522/14; 522/16; 522/81; 522/83; 522/181; 522/121

[58] Field of Search .............. 522/83, 81, 14; 220/21 A

[56] References Cited

U.S. PATENT DOCUMENTS

| | | | |
|---|---|---|---|
| 2,236,296 | 3/1941 | Minich | 134/57 |
| 3,096,184 | 7/1963 | Gallup | 106/20 |
| 3,474,718 | 10/1969 | Guthrie et al. | 96/34 |
| 3,982,941 | 9/1976 | Inskip | 96/34 |
| 3,994,734 | 11/1976 | Cuthbert | 106/38.22 |
| 4,056,453 | 11/1977 | Barzynshi et al. | 204/159.23 |
| 4,306,012 | 12/1981 | Scheve | 430/296 |
| 4,327,283 | 4/1982 | Heyman et al. | 235/487 |
| 4,400,216 | 8/1983 | Arora | 106/23 |
| 4,420,501 | 12/1983 | Ueda et al. | 427/54.1 |
| 4,514,456 | 4/1985 | Deal et al. | 428/204 |
| 4,604,366 | 8/1986 | Kacicz | 106/35 |

*Primary Examiner*—John C. Bleutge
*Assistant Examiner*—Arthur H. Koeckert
*Attorney, Agent, or Firm*—Joseph S. Tripoli; Dennis H. Irlbeck; Vincent J. Coughlin, Jr.

[57] ABSTRACT

An improved transfer printing ink for printing indicia on impervious surfaces, such as glass, is comprised of a liquid resin component comprising one or more liquid acrylate monomers, one or more polyfunctional acrylate monomers, one or more polymeric binders and one or more photoinitiators. The transfer ink also is comprised of a solid component comprising one or more pigment materials and a particulate glass frit mixture. The glass frit mixture consists of a plurality of wetting agents and a frit flux. The wetting agents melt at an elevated temperature to fuse the pigments and the frit flux to the glass.

18 Claims, No Drawings

LOW TEMPERATURE PROCESSING TRANSFER PRINTING INK

BACKGROUND OF THE INVENTION

The invention relates to a transfer printing ink for marking on an impervious workpiece and particularly, although not exclusively, to a transfer ink for printing a coded marking on a glass envelope portion of a cathode-ray tube (CRT).

U.S. Pat. No. 4,327,283 to P. M. Heyman et al., issued on Apr. 27, 1982, discloses a coded machine-readable marking formed by abrading a bar pattern through a top coating formed on an undercoating affixed to an external surface of a glass faceplate panel of a CRT. The method requires forming a black undercoating and then depositing a white layer on the undercoating. A bar code pattern is formed by selectively removing portions of the white coating to form adjacent areas having different reflecting characteristics. The coatings are then fired to fuse the coatings to the surface and to increase their chemical durability. The bar code pattern may be used for item identification and/or for the control of subsequently performed processes. The coatings, which are either frit-type or alkali silicate-type, are applied by spraying or screening and the white coating is removed by an abrasive stream or by a laser. Such a label is labor intensive to produce and therefore costly.

Glass printing inks, such as the ink disclosed in U.S. Pat. No. 3,096,184 to J. L. Gallup, which are applied by a stamping process are most cost effective than the coded marking of the Heyman et al patent, but such inks are unsuitable for use on CRT's because the ink must be fired at 550° C. to drive off the vehicle of the ink mixture.

Printing of bar code labels using transfer inks and a pad printer of the type described in U.S. Pat. No. 4,060,031 to Philips on Nov. 29, 1977 offers considerable advantage over prior printing methods since the pad is made of an ink repellent surface which substantially completely transfers the ink to the printed material. However, prior transfer inks also are incompatible with CRT manufacturing because of improper viscosity, poor pad-transfer characteristics, incompatibility with the relatively low cathode-ray tube processing temperatures, poor bond strength, long drying times or poor reflectivity.

SUMMARY OF THE INVENTION

A cathode-ray tube having an envelope with a faceplate panel includes a coded marking on a portion of the panel. The coded marking is provided by a transfer printing ink comprised of a liquid resin component which includes one or more liquid acrylate monomers, one or more polyfunctional acrylate monomers, one or more polymeric binders and one or more photoinitiators. The transfer ink also includes a solid component comprising one or more pigment materials and a particulate glass frit mixture consisting of a plurality of wetting agents and a frit flux. The wetting agents provide means to fuse the pigments and the frit flux to the faceplate panel.

DETAILED DESCRIPTION OF THE INVENTION

The resin component of the subject transfer inks is comprised of at least one liquid monomer containing an acrylate moiety, at least one liquid polyfunctional acrylate monomer, one or more polymeric binders soluble therein and one or, preferably, a mixture of photoinitiators. As utilized herein, the term "acrylate moiety" means the moiety represented by the formula:

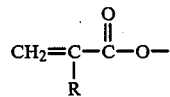

wherein R is hydrogen or methyl. A multifunctional acrylate monomer is one having two or more acrylate moieties.

Representative examples of suitable liquid acrylate monomers in accordance with this invention include acrylic acid, methacrylic acid, alkyl, alkoxy or allyl acrylates, lauryl acrylate, or methacrylates such as methyl methacrylate, stearyl methacrylate, hydroxy propyl methacrylate, and the like. Examples of suitable liquid polyfunctional acrylate monomers include polyethylene glycol diacrylate, tripropylene glycol diacrylate, and the like.

Acrylate and methacrylate monomers which are suitable for inks of this invention are liquid monomers which are recognized as being polymerizable in systems utilizing so-termed free radicals. Generally acrylates are preferred over methacrylates since they have a more rapid cure time. A preferred mixture for the subject inks is one or more acrylate monomers and several polyfunctional acrylate monomers wherein the weight ratio of monofunctional monomers to polyfunctional monomers is from about 2.5:1 to 3.0:1, preferably about 2.7:1. The combined monomers comprise from about 65 to about 69, preferably about 66.8, percent by weight of the resin component.

The binders of the subject inks are utilized to adjust the viscosity of the ink and to impart flexibility and resiliency to indicia produced therefrom. Binders utilized herein are dissolved in the monomer component and must be soluble therein. Preferred binders suitably have a molecular weight of from about 20,000 to about 30,000 and include, for example, linear acrylate polymers, i.e. polymerized monofunctional acrylates or methacrylates or copolymers containing them. A preferred binder is poly(methyl methacrylate). The resin component of the subject inks suitably contains from about 24 to about 30, and preferably about 27, percent by weight of the binder.

The photoinitiator component of the subject ink compositions is comprised of one or, preferably, a mixture of art-recognized compounds. A preferred photoinitiator is a mixture of one or more ketone-type and hindered amine type compounds. Such mixtures suitably contain the ketone compound(s) and the hindered amine compound(s) in a weight ratio of from about 80/20 to 20/80, preferably from about 50/50 to 60/40.

Suitable ketone-type compounds include benzophenones, xanthones, thioxanthones, quinones, hydroquionones and the like, for example, 2,2-diethoxyacetophenone, benzophenone, isopropylthioxanthone, Michler's ketone, i.e. 4,4'-bis-N,N-dimethylaminobenzophenone and the like.

Suitable hindered amines, conventionally termed "surface cure agents", include N-methyldiethanolamine, triethylenediamine, N-methyl-morpholine, triethanolamine, phenylethylethanolamine, N,N,N',N'-tetramethyl-1,3-butanediamine and the like. Generally, the photoinitiator component comprises from about 0.5 to about 10, preferably from about 3 to about 7, percent by weight of the resin component of the subject ink compositions.

The ink compositions of this invention are prepared by dissolving the photoinitiator and the binder in the liquid monomers to form the liquid phase and dispersing the filler component therein. In general, it is necessary to stir the monomer mixture vigorously at from about 50° to 60° for several hours to obtain a solution of the binder. The solid ingredients are then dispersed therein. The subject ink is comprised of from about 28 to about 40, and preferably about 34, percent by weight of the liquid resin component and from about 60 to about 72, and preferably about 66, percent by weight of the solid component.

The solid or filler ingredient is comprised of one or more pigment materials, such as titanium dioxide, antimony trioxide and a suitable particulate glass frit mixture. The solid component of the subject ink is comprised of from about 5 to about 26, and preferably about 14, percent by weight of the pigment material and from about 42 to about 63, and preferably about 47.8, percent by weight of the glass frit mixture. The pigment can be one or more art-recognized materials such as titanium dioxide (anatase or rutile form, with the former being preferred), antimony trioxide or other conventional pigment materials. The titanium dioxide is within the range of from 2.6 to about 15.4 weight percent and the antimony trioxide is within the range of 2.4 to about 10.8 weight percent.

The glass frit is a lead borosilicate glass (frit flux #92 O. Hommel, Carnegie, PA). It is necessary that the glas frit be reduced to a mean particle size of from about 1 to 5, preferably about 3, micrometers in order that the subject ink possesses the desired degree of abrasion resistance.

Since the ink composition of this invention is essentially free of non-reactive solvents, it can be formulated to be of suitable viscosity for pad printing without plasticizing effects on the cured ink layer. It is considered unexpected that an UV-curable ink can be applied by pad printing. It has been found that a formulation having excellent transfer printing characteristics will produce an opaque layer in printed layers 2.0 to 2.25 mil (0.05 to 0.058 mm) thick with minimum levels of print defects. The subject ink is applied to a substrate and cured in a few seconds—curing times of 3 to 5 seconds are typical—with light radiation at between about 350 to 450 nanometers.

The following Example further illustrates this invention, it being understood that the invention is in no way intended to be limited to the details described therein. In the Example, all parts and percentages are on a weight basis and all temperatures are in degrees Celsius, unless otherwise stated.

EXAMPLE

A liquid monomer mixture was prepared by combining 2 parts stearyl methacrylate monomer, 9 parts polyethylene glycol diacrylate monomer, 9 parts tripropylene glycol diacrylate monomer, 5 parts lauryl acrylate monomer, 3 parts of Irgacure 651, a benzophenone derivative available from Ciba-Geigy, Summit, N.J., 0.2 parts of isopropyl thioxanthone and 3 parts of n-methyldiethanolamine.

The temperature of the monomer mixture was raised to about 60°. Stirring was continued at 60° until the resin completely dissolved, about 15 to 25 minutes. 41.8 parts of hydroxypropylmethacrylate monomer was added and 27 parts of poly(methyl methacrylate) binder resin was added and stirring was continued at 60° for about 2 to 3 hours. Stirring was discontinued and the solution was then allowed to return to ambient temperature.

The solid component of the ink was prepared by first processing the frit. The frit mixture was formed by combining 93 parts of the frit flux #92, 2.5 parts of potassium chlorate, 2.5 parts of potassium nitrate and 2 parts of cesium nitrate. The frit mixture was milled so that the mean particle size was from about 1 to 5, and preferably about 3 micrometers.

More specifically, the frit mixture was prepared from a frit concentrate comprising 90.8 grams of potassium chlorate, 90.8 grams of potassium nitrate, 72.64 grams of cesium nitrate and 199.76 grams of the frit flux #92 which was previously milled to the desired particle size. The concentrate was milled for an additional hour to mix the concentrate powders. Then, the concentrate was combined 1 part concentrate with 7 parts additional frit (#92), to achieve the desired proportion of 2.5 percent by weight of potassium chlorate, 2.5 percent by weight potassium nitrate and 2 percent by weight of cesium nitrate and 93 percent by weight frit powder. A preferred frit mixture was prepared by combining 454 grams of the above-described frit concentrate with 3178 grams of additional frit flux #92. The mixture was milled dry for 2 hours.

The function of the wetting agents (potassium chlorate, potassium nitrate and cesium nitrate) is to admix with the frit, remain stable when formulated and then, during thermal processing of the label, to promote wetting of the frit and pigment particles thus, fusing the label strongly to the substrate.

The ink was prepared by placing 34 parts of the monomer mixture in a suitable container. 51.48 parts of the frit mixture was added to the container and mixed at a low speed. After the frit mixture was wetted by the monomer mixture, 5.72 parts of antimony trioxide and 8.8 parts of titanium dioxide, having a mean particle sizes of 0.45 micron and 1.6 micron, respectively, were added thereto with stirring to form a dispersion. The ink was then mixed on a three roll mill until a complete dispersion was produced. The viscosity of the ink was between 400 and 500 poise at 20° C.

GENERAL CONSIDERATIONS

Bar code markings have been pad transfer printed onto glass faceplate panels of cathode-ray tubes using the novel transfer ink. The markings were cured or photosolidified in about 5 seconds by exposure to light of 350 to 450 nanometer wavelength. The ink was processed at temperatures of less than about 470° C. and preferably ranging from about 420° to 460° C. The organic materials present in the marking during UV curing were volatilized during thermal processing of the marking and the wetting agents in the frit mixture melt, flow and wet the particles of the frit and the pigment to fuse the particles to the glass substrate.

While many ceramic inks are commercially available to meet specific printing requirements, none combine the low temperature processing ability with UV curability and pad transferability. Inks that are UV curable and used for screen printing are known; however, these inks must be processed above 500° C. to function satisfactorily as a label. Pad transfer inks also are known, however, these inks are solvent-based and require several minutes of drying time. Other commercial inks, formulated to serve as a white reflective label, if processed at low temperatures (430°–460° C.) discolor (low reflectivity) or exhibit poor bond strength to glass surfaces, thus rendering them unsuitable for this application.

It is known to combine organic materials with inorganic glasses and pigment material to produce reflective, ceramic bonded labels at temperatures in excess of 500° C.; however, kinescope glass must be processed at temperatures less than 460° C. The transfer ink must be compatible with the pad printing method in order to permit the printing of high resolution bar codes on non-smooth and non flat surfaces such as a skirt of a kinescope faceplate. In addition, the ink formulation must provide an initial ink layer thickness of from 2.0 to 2.5 mils (0.05 to 0.06 mm) due to the need for opacity to achieve high reflectivity (a minimum of 60% of the MgO reflectivity standard), for 6328 Å laser light used in commercial bar code readers. This reflectivity must be obtained by thick printing because of the limits on the pigment content and the need to achieve adhesion of the bar code to the glass substrate. After heat treatment of the coded marking, the ink thickness is 1 to 1.2 mils (0.025 to 0.3 mm).

The viscosity of the monomer mixture can be varied by changing the quantities of the poly(methyl methacrylate) and the hydroxy propyl methacrylate.

Since the transfer ink bar code marking is read several times during the manufacturing process, including before and after heat treatment of the bar code, the marking must have good reflectivity throughout the process. The titanium dioxide pigment provides good reflectivity of the marking before heat treatment while the antimony trioxide pigment provides good reflectivity of the marking after heat treatment thereof.

What is claimed is:

1. A cathode-ray tube having an envelope with a faceplate panel including a coded marking thereon, said coded marking comprising a transfer printing ink of a monofunctional resin component including one or more liquid acrylate monomers, one or more difunctional acrylate monomers, one or more polymeric acrylate binders and one or more photoinitiators wherein the binders and the photoinitiators are soluble in the monomers and, dispersed in said liquid resin component, a solid component comprising a suitable quantity of one or more pigments and a glass frit mixture consisting of three wetting agents and a frit flux, said wetting agents providing means to fuse said pigments and said frit flux to said faceplate panel.

2. The cathode-ray tube described in claim 1, wherein said wetting agents are potassium chlorate, potassium nitrate and cesium nitrate.

3. The cathode-ray tube described in claim 1, wherein the weight ratio of the monofunctional acrylate monomers to polyfunctional acrylate monomers of said transfer printing ink is from about 2.5:1 to about 3:1.

4. The cathode-ray tube described in claim 3, wherein the weight ratio of the monofunctional acrylate monomers to difunctional acrylate monomers of said transfer printing ink is about 2.7:1.

5. In a cathode-ray tube having a glass envelope with a faceplate panel including a coded marking thereon, said coded marking comprising a low temperature processing transfer printing ink of a liquid resin component comprising one or more monofunctional acrylate monomers, one or more difunctional acrylate monomers, one or more polymeric acrylate binders and one or more photoinitiators wherein the binders and the photoinitiators are soluble in the monomers and, dispersed in said liquid resin component, a solid component comprising one or more pigment materials and a particulate glass frit, wherein the improvement comprises:
   said solid component consisting of from about 60 to 72 weight percent; and
   said liquid resin component consisting of from about 40 to 28 weight percent of said transfer ink, said liquid resin being volatilizable at a temperature of less than about 470° C.

6. The cathode-ray tube described in claim 5, wherein said solid component comprises a suitable quantity of one or more pigments and a glass frit mixture consisting of three wetting agents consisting of potassium chlorate, potassium nitrate and cesium nitrate, and a frit flux, said wetting agents providing means to fuse said pigments and said frit flux to said faceplate panel.

7. The cathode-ray tube described in claim 5, wherein the weight ratio of the monofunctional acrylate monomers to the difunctional acrylate monomers in said transfer ink is from about 2.5:1 to about 3:1.

8. The cathode-ray tube described in claim 7, wherein the weight ratio of monofunctional acrylate monomers to difunctional acrylate monomers in said transfer ink is about 2.7:1.

9. The cathode-ray tube described in claim 5, wherein said liquid resin component of said transfer ink is photosolidifiable by exposure to actinic radiation.

10. The cathode-ray tube described claim 5, whereas the solid component of said transfer ink is comprised of from about 42 to about 63 weight percent glass frit mixture, from about 2.4 to about 10.8 weight percent antimony trioxide and from about 2.6 to about 15.4 weight percent titanium dioxide.

11. The cathode-ray tube described in claim 5, wherein the liquid resin component of said transfer ink comprises from about 65 to 69 weight percent of said monomers, from about 24 to 30 weight percent of said binders and the balance being said photoinitiators.

12. In a lowtemperature processing transfer printing ink of a liquid resin compound for providing a coded marking on a cathode-ray tube envelope, said compound comprising one or more monofunctional acrylate monomers, one or more difunctional acrylate monomers, one or more polymeric acrylate binders and one or more photoinitiators wherein the binders and the photoinitiators are soluble in the monomers and, dispersed in said liquid resin component, a solid component comprising one or more pigment materials and a particulate glass frit, wherein the improvement comprises:
   said solid component consisting of from about 60 to 72 weight percent of said transfer ink, said solid component comprising said pigment materials and a glass frit mixture consisting of three wetting agents and a frit flux, said wetting agents including potassium chlorate, potassium nitrate and cesium nitrate; and
   said liquid resin component consisting of from about 40 to 28 percent by weight, said liquid resin component being photosolidifiable by exposure to actinic radiation from about 350 to about 450 nanometers and volatilizable at a temperature from about 420° to 460° C.

13. The transfer printing ink described in claim 12, wherein wetting agents being melted to fuse said pigments and said frit flux to said faceplate panel.

14. The transfer ink described in claim 13, wherein the weight ratio of the monofunctional acrylate monomers to the difunctional acrylate monomers is from about 2.5:1 to about 3:1.

15. The transfer ink described in claim 14, wherein the weight ratio of monofunctional acrylate monomers to difunctional acrylate monomers is about 1.7:1.

16. The transfer ink described in claim 12, wherein said liquid resin component is photosolidifiable by exposure to actinic radiation.

17. The transfer ink in accordance with claim 12, whereas the solid component is comprised of from about 42 to about 63 weight percent glass frit mixture, from about 2.4 to about 10.8 weight percent antimony trioxide and from about 2.6 to about 15.4 weight percent titanium dioxide.

18. The transfer ink in accordance with claim 12, wherein the liquid resin component comprises from about 65 to 69 weight percent of said monomers, from about 24 to 30 weight percent of said binders and the balance being said photoinitiators.

* * * * *

UNITED STATES PATENT AND TRADEMARK OFFICE
CERTIFICATE OF CORRECTION

PATENT NO. : 4,856,670

DATED : August 15, 1989

INVENTOR(S) : Kenneth W. Hang, et al

It is certified that error appears in the above-identified patent and that said Letters Patent is hereby corrected as shown below:

Col. 3, line 33, change "glas" to --glass--.

Col. 5, line 58, change "polyfunctional" to --difunctional--.

Signed and Sealed this

Seventeenth Day of July, 1990

*Attest:*

HARRY F. MANBECK, JR.

*Attesting Officer*  *Commissioner of Patents and Trademarks*